United States Patent
Wang

(10) Patent No.: US 9,134,582 B2
(45) Date of Patent: Sep. 15, 2015

(54) ARRAY SUBSTRATE, LIQUID CRYSTAL PANEL AND LIQUID CRYSTAL DISPLAY DEVICE

(71) Applicants: BOE Technology Group Co., Ltd., Beijing (CN); Beijing BOE Display Technology Co., Ltd., Beijing (CN)

(72) Inventor: Boaqiang Wang, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 127 days.

(21) Appl. No.: 13/943,329

(22) Filed: Jul. 16, 2013

(65) Prior Publication Data

US 2014/0028945 A1    Jan. 30, 2014

(30) Foreign Application Priority Data

Jul. 26, 2012   (CN) ...................... 2012 2 0367115 U

(51) Int. Cl.
*G02F 1/136* (2006.01)
*G02F 1/1362* (2006.01)

(52) U.S. Cl.
CPC ...... *G02F 1/136286* (2013.01); *G02F 1/13624* (2013.01)

(58) Field of Classification Search
CPC .................. G02F 1/13624; G02F 1/136286
USPC ........................................................ 349/48
See application file for complete search history.

(56) References Cited

U.S. PATENT DOCUMENTS

| | | | | |
|---|---|---|---|---|
| 7,982,219 B2 * | 7/2011 | Kuo et al. | | 349/48 |
| 2002/0145696 A1 * | 10/2002 | Kim | | 349/149 |
| 2003/0189559 A1 * | 10/2003 | Lee et al. | | 345/204 |
| 2004/0041826 A1 * | 3/2004 | Nakagawa et al. | | 345/694 |
| 2011/0017994 A1 * | 1/2011 | Kuo et al. | | 257/59 |
| 2013/0027326 A1 * | 1/2013 | Kim et al. | | 345/173 |
| 2014/0054624 A1 * | 2/2014 | Chen et al. | | 257/89 |

OTHER PUBLICATIONS

European Patent Office Communication and European Search Report, issued Nov. 4, 2013, 6 pages.
Examination Opinion (Korean language) issued by the Korea Intellectual Property Office ("KIPO") on May 26, 2014 for International Application No. 10-2013-0083676, 4 pages.
English translation of Examination Opinion (listed above) issued by KIPO for International Application No. 10-2013-0083676, 3 pages.
EPO Office Action for Application EP13173932.8, rendered Apr. 24, 2015; 5 pages.

* cited by examiner

*Primary Examiner* — Richard Kim
*Assistant Examiner* — Ryan Crockett

(57) ABSTRACT

Embodiments of the invention provide an array substrate, a liquid crystal display panel and a liquid crystal display device. The array substrate comprises a plurality of array substrate units, each of which comprising: gate lines and data lines extending along a first direction and a second direction crossing with each other, respectively, in a plane of a substrate. Each array substrate unit comprises four array substrate sub-units which are arranged in the first direction and the second direction to form sub-unit rows and sub-unit columns, and each of sub-unit rows and sub-unit columns has two array substrate sub-units. The three gate lines are shared by two array substrate sub-units in each sub-unit row, and the one data line and one of the gate lines are shared by two array substrate sub-units in each sub-unit column.

10 Claims, 3 Drawing Sheets

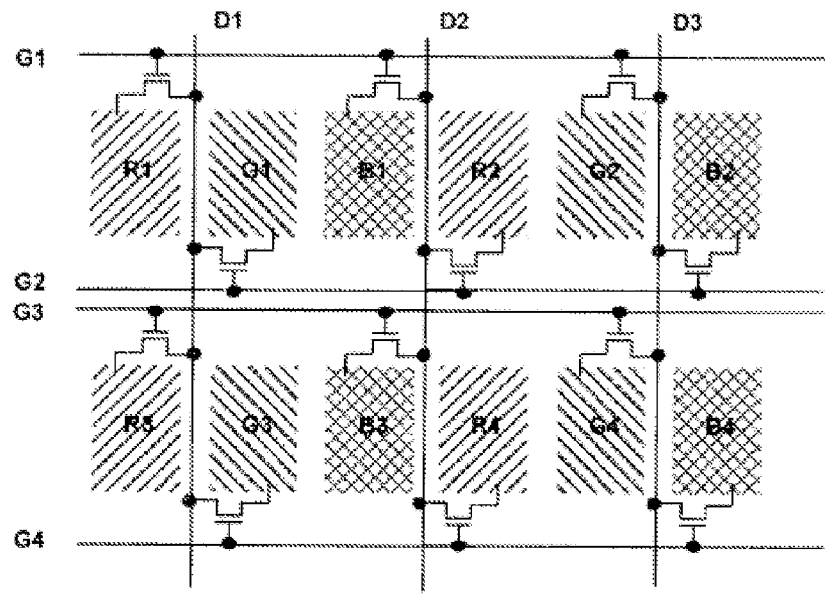
Figure 1 - Prior Art
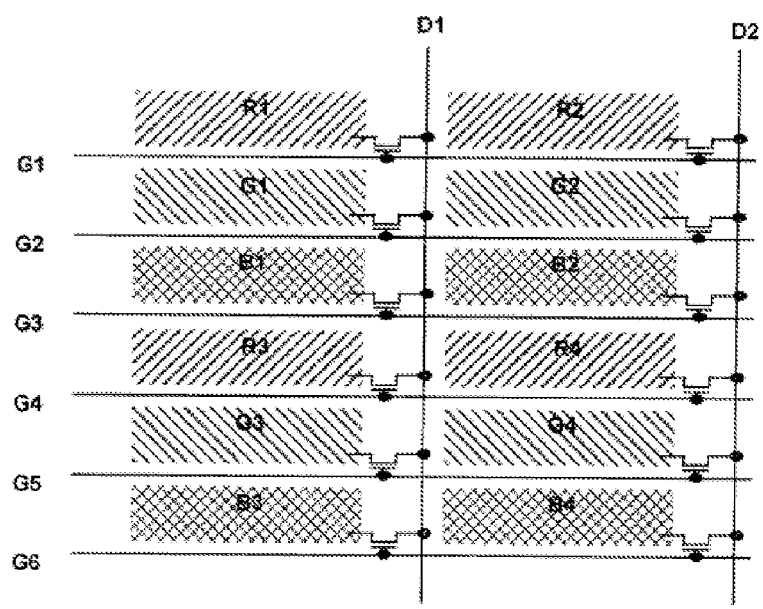
Figure 2 - Prior Art

ARRAY SUBSTRATE, LIQUID CRYSTAL PANEL AND LIQUID CRYSTAL DISPLAY DEVICE

CROSS REFERENCE TO RELATED APPLICATIONS

This application claims priority from Chinese National Application No. 201220367115.0, filed on Jul. 26, 2012, the contents of which are incorporated herein by reference.

FIELD OF THE INVENTION

Embodiments of the present invention relate to an array substrate, a liquid crystal display panel and a liquid crystal display device.

BACKGROUND

A liquid crystal display device is a flat panel display device in which arrangement of liquid crystal molecules is controlled by an electric field formed between a pixel electrode and a common electrode within the panel so that a refractive index of the liquid crystal molecules to light is controlled and an image is displayed. A panel of the liquid crystal display device is constituted by an array substrate and a color filter substrate. The array substrate includes a gate line extending in a horizontal direction and a data line extending in a vertical direction, and a switch is provided in each of intersections between the gate line and the data line so as to control each pixel.

Typically, the array substrate is constituted by a number of array substrate units. In the prior art, many design solutions on the array substrate units have been proposed.

FIG. 1 is a schematic structural diagram of an array substrate unit. The array substrate unit illustrated in FIG. 1 adopts a Dual Gate driving mode, and its specific structure is: the array substrate unit is provided with a first gate line G1, a second gate line G2, a third gate line G3 and a fourth gate lines G4 which extend in the horizontal direction, and a first data line DE a second data line D2 and a third data line D3 which extend in the vertical direction. A pixel RE a pixel G1, a pixel B1, a pixel R2, a pixel G2 and a pixel B2 are provided between the first gate line G1 and the second gate line G2, and the respective pixels are arranged in the horizontal direction between the first gate line G1 and the second gate line G2. A pixel R3, a pixel G3, a pixel B3, a pixel R4, a pixel G4 and a pixel B4 are provided between the third gate line G3 and the fourth gate line G4, the respective pixels are arranged in the horizontal direction between the third gate line G3 and the fourth gate lines G4. The pixel R1, the pixel G1 and the pixel B1 and the gate lines and the data line connected thereto constitute a first array substrate sub-unit; the pixel R2, the pixel G2, and the pixel B2, and the gate lines and the data line connected thereto constitute a second array substrate sub-unit; the pixel R3, the pixel G3 and the pixel B3, and the gate lines and the data line connected thereto constitute a third array substrate sub-unit; the pixel R4, the pixel G4, the pixel B4, and the gate lines and the data lines connected thereto constitute a fourth array substrate sub-unit. In each array substrate sub-unit, each pixel is connected to the gate lines and data line in a similar manner, except being connected to different gate lines and data line. The following description is made by taking the first array substrate sub-unit as an example. The pixel R1 is electrically connected to the first gate line G1 and the first data line D1 though a switch, respectively; the pixel G1 is electrically connected to the second gate line G2 and the first data line D1 though a switch, respectively; the pixel B1 is electrically connected to the second gate line G2 and the second data line D2 though a switch, respectively.

FIG. 2 is a schematic structural diagram of another array substrate unit. The array substrate unit illustrated in FIG. 2 adopts a Triple Gate driving mode, and its specific structure is: the array substrate unit is provided with a first gate line G1, a second gate line G2, a third gate line G3, a fourth gate lines G4, a fifth gate line G5 and a sixth grid line G6 which extend in the horizontal direction, and a first data line D1 and a second data line D2 which extend in the vertical direction. Different from the pixel structure in FIG. 1, the long side of each pixel is in the horizontal direction, and the short side in the vertical direction in FIG. 2. The pixel R1 and the pixel R2 are arranged horizontally above the first gate line G1, the pixel R1 is electrically connected to the first gate line G1 and the first data line D1, the pixel R2 is electrically connected to the first gate line G1 and the second data line D2; the pixel G1 and the pixel G2 are arranged horizontally between the first gate line G1 and the second gate line G2, the pixel G1 is electrically connected to the second gate line G2 and the first data line D1, and the pixel G2 is electrically connected to the second gate line G2 and the second data line D2; the pixel B1 and the pixel B2 are arranged horizontally between the second gate line G2 and the third gate line G3, the pixel B1 is electrically connected to the third gate line G3 and the first data line D1, and the pixel B2 is electrically connected to the third gate line G3 and the second data line D2; the pixel R3 and the pixel R4 are arranged horizontally between the third gate line G3 and the fourth gate line G4, the pixel R3 is electrically connected to the fourth gate line G4 and the first data line D1, and the pixel R4 is electrically connected to the fourth gate line G4 and the second data line D2; the pixel G3 and the pixel G4 are arranged horizontally between the fourth gate line G4 and the fifth gate line G5, the pixel G3 is electrically connected to the fifth gate line G5 and the first data line D1, and the pixel G4 is electrically connected to the fifth gate line G5 and the second data line D2; the pixel B3 and the pixel B4 are arranged horizontally between the fifth gate line G5 xand the sixth gate line G6, the pixel B3 is electrically connected to the sixth gate line G6 and the first data line D1, and the pixel B4 is electrically connected to the sixth gate line G6 and the second data line D2.

During the array substrate, which is constituted by array substrate units, is incorporated into a panel, Chip On Film (COF) is required. The number of COF is relative to the number of the gate lines and data lines. The more gate lines and data lines, the more COF is required, which means more product cost. Therefore, how to design a array substrate unit to reduce the number of the gate lines and the data lines and further reduce the COF quantity in the liquid crystal manufacturing process has become a technical problem in the prior art to be solved.

SUMMARY

Embodiments of the invention provide an array substrate unit, an array substrate, a liquid crystal display panel and a liquid crystal display device, so as to reduce the number of COF used in the manufacturing process of the liquid crystal panel.

An embodiment of the present invention is to provide an array substrate, comprising a plurality of array substrate units, each of which comprising: gate lines and data lines extending along a first direction and a second direction crossing with each other, respectively, in a plane of a substrate, wherein, each array substrate unit comprises four array substrate sub-units which are arranged in the first direction and the second direction to form sub-unit rows and sub-unit columns, and each of sub-unit rows and sub-unit columns has two array substrate sub-units, each array substrate sub-unit comprises three pixels, and one data line and three gate lines which are electrically connected to the three pixels, the three gate lines comprising a first gate line, a second gate line and a third gate line; and the three gate lines are shared by two array substrate sub-units share in each sub-unit row, and the one data line and one of the gate lines are shared by two array substrate sub-units in each sub-unit column.

Another embodiment of the present invention provides comprising a color filter substrate, the above array substrate and liquid crystal interposed between the color filter substrate and the array substrate.

Still another embodiment of the present invention provides a liquid crystal display device comprising a backlight, a liquid crystal panel, and an integrated circuit board that provides control signals to the liquid crystal panel, the liquid crystal display panel comprising a color filter substrate, the above array substrate and liquid crystal interposed between the color filter substrate and the array substrate.

The array substrate unit according to the embodiments of the present invention includes five gate lines and two data lines, which is reduced by one data line when comparing with the array substrate unit in the Dual Gate driving mode, and reduced by one gate line when comparing with the array substrate unit in the Triple Gate driving mode. Since each liquid crystal panel includes several hundreds of array substrate units, the number of COF used in the manufacturing process of the liquid crystal panel is reduced effectively.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

FIG. 1 is structural diagram of an array substrate unit in a Dual Gate driving mode in the prior art;

FIG. 2 is structural diagram of an array substrate unit in a Triple Gate driving mode in the prior art;

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

In order to reduce the COF number required in the liquid crystal panel manufacturing process, embodiments of the invention provide an array substrate unit, an array substrate, a liquid crystal panel and a liquid crystal display device.

According to an embodiment of the present invention, an array substrate unit includes four array substrate sub-units, and these array substrate sub-units are symmetric in pair-wise manner in a horizontal direction and a vertical direction. Each array substrate sub-unit includes three pixels, respectively, a pixel R, a pixel G, and a pixel B, and one data line and three gate lines electrically connected to the three pixels. The three gate lines are a gate line G1, a gate line G2 and a gate line G3. Two array substrate sub-units arranged in the horizontal direction share the three gate lines, and two array substrate sub-units arranged in the vertical direction share the one data base line and one of the gate lines.

For example, the four array substrate sub-units are arranged in the horizontal direction and the vertical direction to form sub-unit rows and sub-unit columns, and each sub-unit row and each sub-unit column includes two array substrate sub-units.

For example, each array substrate sub-unit includes three pixels, and one data line and three gate lines which are electrically connected to the three pixels, and the three gate lines includes a first gate line, a second gate line and a third gate line. The three gate lines are shared by two array substrate sub-units in each sub-unit row, and the one data line and one of the gate lines are shared by two array substrate sub-units in each sub-unit column.

In one example, within each array substrate sub-unit, the first gate line, the three pixels, the second gate line and the third gate line are arranged sequentially in the second direction; within each array substrate unit, the first sub-unit row and the second sub-unit row are arranged sequentially in the second direction, the third gate line for the first sub-unit row and the first gate line for the second sub-unit row are the same gate line. For example, in each array substrate sub-unit, the three pixels are arranged in the first direction.

Figure 3A:
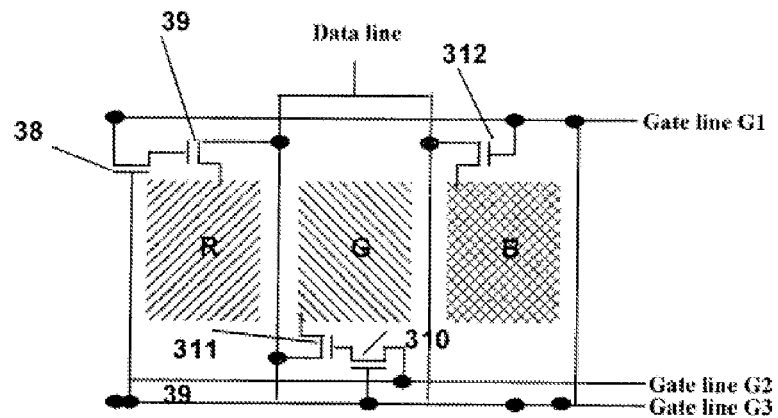
FIG. 3a is a structural diagram of an array substrate sub-unit according to an embodiment of the invention.

For example, FIG. 3a is a structural diagram of an array substrate sub-unit. In each array substrate sub-unit, a pixel R is electrically connected to a gate line G1, a gate line G3 and a data line through a first TFT 38 and a second TFT 39. For example, the gate electrode of the first TFT 38 is connected to the gate line G3, the drain electrode of the first TFT 38 is connected to the gate line G1, the source electrode of the first TFT 38 is connected to the gate electrode of the second TFT 39, the drain electrode of the second TFT 39 is connected to the data line, the source electrode of the second TFT 39 is connected to the pixel R. A pixel G is electrically connected to the gate line G2, the gate line G3 and the data line through a third TFT 310 and a fourth TFT 311. For example, the gate electrode of the third TFT 310 is connected to the gate line G3, the drain electrode of the third TFT 310 is connected to the gate line G2, the source electrode of the third TFT 310 is connected to the gate electrode of the fourth TFT 311, the drain electrode of the fourth TFT 311 is connected to the data line, the source electrode of the fourth TFT 311 is connected to the pixel G. A pixel B is electrically connected to the gate line G1 and the data line through a fifth TFT 312. For example, the gate electrode of the fifth TFT 312 is connected to the gate line G1, and the drain electrode of the fifth TFT 312 is connected to the data line, and the source electrode of the fifth TFT 312 is connected to the pixel B.

Figure 3B:
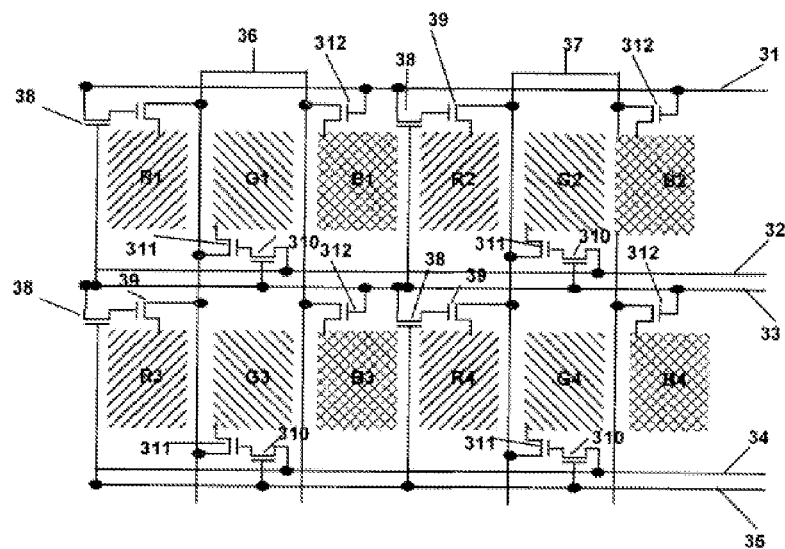
FIG. 3b is a structural diagram of an array substrate unit according to an embodiment of the invention.

As for an array substrate unit constituted by four array substrate sub-units, the two array substrate sub-units sequentially arranged in the horizontal direction share three gate lines, and the two array substrate sub-units arranged in the vertical direction share a single data line. In the vertical direction, the first gate line in a lower array substrate sub-unit and the last gate line in the upper array substrate sub-unit are the same gate line. For convenience of description, the three gate lines connected to the two array substrate sub-units (in the upper side in FIG. 3b) sequentially arranged in the horizontal direction are represented as a first gate line 31, a second gate line 32, a third gate line 33; the three gate lines connected to the other two array substrate sub-units (in the lower side in FIG. 3b) sequentially arranged in the horizontal direction are represented as the third gate line 33, a fourth gate line 34, a fifth gate line 35. That is to say, the two array substrate sub-units (in the upper side in FIG. 3b) sequentially arranged in the horizontal direction share the first gate line, the second gate line, and the third gate line; the other two array substrate sub-units (in the lower side in FIG. 3b) sequentially arranged in the horizontal direction share the third gate line, the fourth gate line, and the fifth gate line, as illustrated in FIG. 3b.

The array substrate unit includes the first gate line 31, the second gate line 32, a third gate line 33, the fourth gate line 34 and the fifth grid lines 35 which extend in the horizontal direction, and a first data line 36 and a second data line 37 which extend in the vertical direction; a pixel R1, a pixel G1, a pixel B1, a pixel R2, a pixel G2, a pixel B2 provided between the first gate line 31 and the second gate line 32 in this order; a pixel R3, a pixel G3, a pixel B3, a pixel R4, a pixel G4, a pixel B4 provided between the third gate line 33 and the fourth gate line 34. Each gate line is used to supply driving signals, and each data line is used to supply voltage signals the polarities of which are reversed continuously.

For example, the pixel R1 is electrically connected to the first gate line 31, the third gate line 33 and the first data line 36; the pixel G1 is electrically connected to the second gate line 32, the third gate line 33 and the first data line 36; the pixel B1 is electrically connected to the first gate line 31 and the first data line 36; the pixel R2 is electrically connected to the first gate line 31, the third gate line 33 and the second data line 37; the pixel G2 is electrically connected to the second a gate line 32, the third gate line 33 and the second data line 37; the pixel B2 is electrically connected to the first gate line 31 and the second data line 37; the pixel R3 is electrically connected to the third gate line 33, the fifth gate line 35 and the first data line 36; the pixel G3 is electrically connected to the fourth gate line 34, the fifth gate line 35 and the first data line 36; the pixel B3 is electrically connected to the third gate line 33 and the first data line 36; the pixel R4 is electrically connected to the third gate line 33, the fifth gate line 35 and the second data line 37; the pixel G4 is electrically connected to the fourth gate line 34, the fifth gate line 35 and the second data line 37; the pixel B4 is electrically connected to the third pixel gate line 33 and the second data line 37.

The pixel R1, the pixel G1, the pixel B1, and the gate lines and the data line connected to each pixel constitute a first array substrate sub-unit, i.e. the pixel R1, the pixel G1, the pixel B1, the first gate line 31, the second gate line 32, the third gate line 33 and the first data line 36 constitute the first array substrate sub-unit, the pixel R2, the pixel G2, the pixel B2, and the gate lines and the data line connected to each pixel constitute a second array substrate sub-unit, i.e., the pixel R2, the pixel G2, the pixel B2, and the first gate line pixel 31, the second gate line 32, the third gate line 33 and the second data line 37 constitute the second array substrate sub-unit. The second array substrate sub-unit and the first array substrate sub-unit share the three gate lines, i.e., the first gate line 31, the second gate line 32 and the third gate line 33. The pixel R3, the pixel G3, the pixel B3 and the gate lines and the data line connected to each pixel constitute a third array substrate sub-unit, i.e., the pixels R3, the pixel G3, the pixel B3, the third gate line 33, the fourth gate line 34, the fifth gate line 35 and the first data line 36 constitute the third array substrate sub-unit. The third array substrate sub-unit and the first array substrate sub-unit share the first data line 36 and the third gate line 33. The pixel R4, the pixel G4, the pixel B4 pixel and the gate lines and the data line connected to each pixel constitute a fourth array substrate sub-unit, i.e., the pixel R4, the pixel G4, the pixel B4, the third gate line 33, the fourth gate line 34, the fifth gate line 35 and the second data line 37 constitute the fourth array substrate sub-unit. The fourth array substrate sub-unit and the third array substrate sub-unit share three gate lines, i.e., the third gate line 33, the fourth gate line 34 and the fifth gate line 35; the fourth array substrate sub-unit and the second array substrate sub-unit share the second data line 37 and the third gate line 33. In each array substrate sub-unit, each pixel is electrically connected to the corresponding gate line and data line through switches and the switches include but not limited to thin film transistor (TFT).

In one example, if each pixel is connected to the corresponding gate line and data line through the TFT, as illustrated in FIG. 3, the specific structure can be as follows: in the first array substrate sub-unit, the pixel R1 is electrically connected to the first gate line 31, the third gate line 33 and the first data line 36 through the first TFT 38 and the second TFT 39. For example, the gate electrode of the first TFT 38 is connected to the third gate line 33, the drain electrode of the first TFT 38 is connected to the first gate line 31, the source electrode of the first TFT 38 is connected to the gate electrode of the second TFT 39, the drain electrode of the second TFT 39 is connected to the first data line, the source electrode of the second TFT 39 is connected to the pixel R1. The pixel G1 is electrically connected to the second gate line 32, the third gate line 33 and the first data line 36 through the third TFT 310 and the fourth TFT 311. For example, the gate electrode of the third TFT 310 is connected to the third gate line 33, the drain electrode of the third TFT 310 is connected to the second gate line 32, a source electrode of the third TFT 310 is connected to a gate electrode of the fourth TFT 311, the drain electrode of the fourth TFT 311 is connected to the first data line, the source electrode of the fourth TFT 311 is connected to the pixel G1. The pixel B1 is electrically connected to the first gate line 31 and the first data line through a fifth TFT 312. For example, the gate electrode of the fifth TFT 312 is connected to the first gate line 31, the drain electrode of the fifth TFT 312 is connected to the first data line, and the source electrode of the fifth TFT 312 is connected to the pixel B 1.

In the second array substrate sub-unit, the pixel R2 is electrically connected to the first gate line 31, the third gate line 33 and the second data line through the first TFT 38 and the second TFT 39. For example, the gate electrode of the first TFT 38 is connected to the third gate line 33, the drain electrode of the first TFT 38 is connected to the first gate line 31, the source electrode of the first TFT 38 is connected to the gate electrode of the second TFT 39, the drain electrode of the second TFT 39 is connected to the second data line, and the source electrode of the second TFT 39 is connected to the pixel R2. The pixel G2 is electrically connected to the second gate line 32, the third gate line 33 and the second data line through the third TFT 310 and the fourth TFT 311. For example, the gate electrode of the third TFT 310 is connected to the third gate line 33, the drain electrode of the third TFT 310 is connected to the second gate line 32, the source electrode of the third TFT 310 is connected to the gate electrode of the fourth TFT 311, the drain electrode of the fourth TFT 311 is connected to the second data line, the source electrode of the fourth TFT 311 is connected to the pixel G2. The pixel B2 is electrically connected to the first gate line 31 and the second data line through a fifth TFT 312. For example, the gate electrode of the fifth TFT 312 is connected to the first gate line 31, the drain electrode of the fifth TFT 312 is connected to the second data line, and the source electrode of the fifth TFT 312 is connected to the pixel B2.

In the third array substrate sub-unit, the pixel R3 is electrically connected to the third gate line 31, the fifth gate line 35 and the first data line through the first TFT 38 and the second TFT 39. For example, the gate electrode of the first TFT 38 is connected to the fifth gate line 35, the drain electrode of the first TFT 38 is connected to the third gate line 33, the source electrode of the first TFT 38 is connected to a gate electrode of the second TFT 39, the drain electrode of the second TFT 39 is connected to the first data line, and the source electrode of the second TFT 39 is connected to the pixel R3. The pixel G3 is electrically connected to the fourth gate line 34, the fifth gate line 35 and the first data line 36 through the third TFT 310 and the fourth TFT 311. For example, the gate electrode of the third TFT 310 is connected to the fifth gate line 35, the drain electrode of the third TFT 310 is connected to the fourth gate line 34, the source electrode of the third TFT 310 is connected to the gate electrode of the fourth TFT 311, the drain electrode of the fourth TFT 311 is connected to the first data line 36, and the source electrode of the fourth TFT 311 is connected to the pixel G3. The pixel B3 is electrically connected to the third gate line 33 and the first data line 36 through a fifth TFT 312. For example, the gate electrode of the fifth TFT 312 is connected to the third gate line 33, the drain electrode of the fifth TFT 312 is connected to the first data line 36, and the source electrode of the fifth TFT 312 is connected to the pixel B3.

In the fourth array substrate sub-unit, the pixel R4 is electrically connected to the third gate line 31, the fifth gate line 35 and the second data line 37 through the first TFT 38 and the second TFT 39. For example, the gate electrode of the first TFT 38 is connected to the fifth gate line 35, the drain electrode of the first TFT 38 is connected to the third gate line 33, the source electrode of the first TFT 38 is connected to a gate electrode of the second TFT 39, the drain electrode of the second TFT 39 is connected to the second data line 37, and the source electrode of the second TFT 39 is connected to the pixel R4. The pixel G4 is electrically connected to the fourth gate line 34, the fifth gate line 35 and the second data line 37 through the third TFT 310 and the fourth TFT 311. For example, the gate electrode of the third TFT 310 is connected to the fifth gate line 35, the drain electrode of the third TFT 310 is connected to the fourth gate line 34, the source electrode of the third TFT 310 is connected to the gate electrode of the fourth TFT 311, the drain electrode of the fourth TFT 311 is connected to the second data line 37, and the source electrode of the fourth TFT 311 is connected to the pixel G4. The pixel B4 is electrically connected to the third gate line 33 and the second data line 37 through a fifth TFT 312. For example, the gate electrode of the fifth TFT 312 is connected to the third gate line 33, the drain electrode of the fifth TFT 312 is connected to the second data line 37, and the source electrode of the fifth TFT 312 is connected to the pixel B4.

Figure 4:
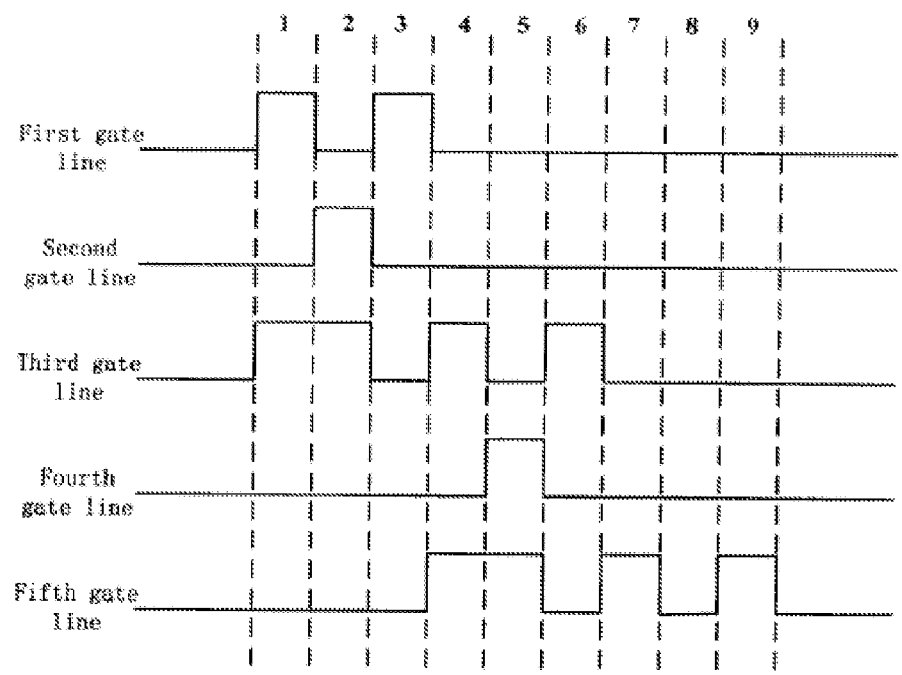
FIG. 4 is a waveform of a driving signal supplied by each gate line according to an embodiment of the invention.

FIG. 4 illustrates a waveform of driving signals supplied by various gate lines according to an embodiment of the invention. Upon the time 1 being reached, the first gate line 31 and the third gate line 33 are in a high level, the rest of the gate lines are in a low level, so that the first data line 36 charges the pixel R1 and the pixel B1, and the second data line 37 charges the pixel R2 and the pixel B2. Assuming a voltage required by the pixel R1 is 8V, and a voltage required by the pixel B1 is 16V, at the time 1, charging on the pixel B1 is a pre-charge, and for the next time of charging on the pixel B1, it can be started from 8V. Similarly, at the time 1, charging on the pixel B2 is a pre-charge, and for the next time of charging on the pixel B2, it can be started from 8V. At the time 2, the second gate line 32 and the third gate line 33 is in a high level, the first data line 36 charges the pixel G1, the second data line 37 charges the pixel G2. At time 3, the first gate line 31 is in a high level, the first data line 36 charges the pixel B1, the second data line 37 charges the pixel B2, and so on. The gate lines control the data lines according to the received driving signals to charge each pixel at the time 4, the time 5, the time 6, the time 7 and the time 8.

The structure of the array substrate unit is described with the first gate line, the second gate line, the third gate line, the fourth gate line and the fifth gate line as above. However, the structure for each array substrate sub-unit in the array substrate unit is the same. Actually, each array substrate sub-unit includes three gate lines, and the third gate line and the first gate line between two sub-unit rows adjacent in the vertical direction are the same gate line (shared). That is, the above first to fifth gate lines may be referred as the first gate line for the first sub-unit row, the second gate line for the first sub-unit row, the third gate line for the first sub-unit row (or the first gate line for the second sub-unit row), the second gate line for the second sub-unit row and the third gate line for the second sub-unit row.

The above horizontal direction and the vertical direction are two directions perpendicular to each other in a plane of the array substrate, respectively. However, the array substrate according to the present embodiment is not limited to two directions perpendicular to each other, but may be crossing with each other in any other angles.

For example, a predetermined number of array substrate units according to the embodiments of the invention can constitute an array substrate, and the array substrate can be used to constitute a liquid crystal panel in which liquid crystal is interposed between the array substrate and a color filter substrate. Further, the liquid crystal panel, together with a backlight and an integrated circuit board for supplying control signals to the liquid crystal panel, can be used to constitute a liquid crystal display device. In the above devices, except that the array substrate adopts the array substrate according to the embodiments of the invention, other structures can be the same as those in the prior art, which will not be described in detail herein.

Further, a plurality of array substrate units according to the embodiments of the present invention can be arranged in a matrix in an array substrate. In the vertical direction, the last third gate line in the previous array substrate unit and the foremost first gate line in the next array substrate unit can be the same gate line.

Embodiments of the present invention provide an array substrate unit, an array substrate, a liquid crystal display panel and a liquid crystal display device. Each array substrate unit includes four array substrate sub-units, and these array substrate sub-units are symmetric in pair-wise manner in a horizontal direction and a vertical direction. Each array substrate sub-unit includes three pixels, and one data lines and three gate lines electrically connected to the three pixels. Two array substrate sub-units arranged in the horizontal direction share the three gate lines, and two array substrate sub-units arranged in the vertical direction share the one data base line and one of the gate lines. Therefore, the array substrate unit according to the embodiments of the present invention includes five gate lines and two data lines, which is reduced by one data line when comparing with the array substrate unit in the Dual Gate driving mode, and reduced by one gate line when comparing with the array substrate unit in the Triple Gate driving mode. Since each liquid crystal panel includes several hundreds of array substrate units, the number of COF used in the manufacturing process of the liquid crystal panel can be reduced effectively.

The foregoing are merely exemplary embodiments of the invention, but are not used to limit the protection scope of the invention. The protection scope of the invention shall be defined by the attached claims.

What is claimed is:

1. An array substrate, comprising a plurality of array substrate units, each of which comprising:
    gate lines and data lines extending along a first direction and a second direction crossing with each other, respectively, in a plane of a substrate, wherein,
    each array substrate unit comprises four array substrate sub-units which are arranged in the first direction and the second direction to form sub-unit rows and sub-unit columns, and each of sub-unit rows and sub-unit columns has two array substrate sub-units,
    each array substrate sub-unit comprises three pixels, and one data line and three gate lines which are electrically connected to the three pixels, the three gate lines comprising a first gate line, a second gate line and a third gate line; and the three gate lines are shared by two array substrate sub-units in each sub-unit row, and the one data line and one of the gate lines are shared by two array substrate sub-units in each sub-unit column, and wherein,
    within each array substrate sub-unit, the first gate line, the three pixels, the second gate line and the third gate line are arranged sequentially in the second direction; within each array substrate unit, the first sub-unit row and the second sub-unit row are arranged sequentially in the second direction, the third gate line for the first sub-unit row and the first gate line for the second sub-unit row are the same gate line.

2. The array substrate according to claim 1, wherein, within each array substrate sub-unit, the three pixels are arranged in the first direction.

3. The array substrate according to claim 1, wherein, within each array substrate sub-unit, each pixel is electrically connected to a corresponding gate line and a corresponding data line, respectively, through a switch.

4. The array substrate according to claim 3, wherein the switch is a thin-film transistor (TFT).

5. The array substrate according to claim 4, wherein the three pixels are a first pixel, a second pixel and a third pixel, respectively; and within each array substrate sub-unit, the first pixel is electrically connected to the first gate line, the third gate line and the data line through a first TFT and a second TFT, respectively, a gate electrode of the first TFT is connected to the third gate line, a drain electrode of the first TFT is connected to the first gate line, a source electrode of the first TFT is connected to a gate electrode of the second TFT, a drain electrode of the second TFT is connected to the data line, a source electrode of the second TFT is connected to the first pixel; the second pixel is electrically connected to the second gate line, the third gate line and the data line through a third TFT and a fourth TFT, respectively, a gate electrode of the third TFT is connected to the third gate line, a drain electrode of the third TFT is connected to the second gate line, a source electrode of the third TFT is connected to a gate electrode of the fourth TFT, a drain electrode of the fourth TFT is connected to the data line, a source electrode of the fourth TFT is connected to the second pixel; the third pixel is electrically connected to the first gate line and the data line through a fifth TFT, a gate electrode of the fifth TFT is connected to the first gate line, a drain electrode of the fifth TFT is connected to the data line, and a source electrode of the fifth TFT is connected to the third pixel.

6. The array substrate according to claim 1, wherein a plurality of the array substrate units are arranged in a matrix, and in the second direction, the last third gate line in a previous array substrate unit and the foremost first gate line in a next array substrate unit are the same gate line.

7. The array substrate according to claim 1, wherein the first direction and the second direction are perpendicular to each other.

8. The array substrate according to claim 1, wherein the gate lines are configured to supply driving signals, and the data line is configured to supply voltage signals polarities of which are reversed continuously.

9. A liquid crystal display panel, comprising a color filter substrate, an array substrate and liquid crystal interposed between the color filter substrate and the array substrate, wherein the array substrate is an array substrate according to claim 1.

10. A liquid crystal display device, comprising a backlight, a liquid crystal panel, and an integrated circuit board that provides control signals to the liquid crystal panel, the liquid crystal display panel comprising a color filter substrate, an array substrate and liquid crystal interposed between the color filter substrate and the array substrate, wherein the array substrate is an array substrate according to claim 1.

* * * * *